(12) United States Patent
Kawai et al.

(10) Patent No.: US 8,034,171 B2
(45) Date of Patent: Oct. 11, 2011

(54) WATER BASE INK FOR INK-JET RECORDING, INK CARTRIDGE, AND INK-JET RECORDING APPARATUS

(75) Inventors: Narumi Kawai, Nagoya (JP); Hisako Tonishi, Kariya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 221 days.

(21) Appl. No.: 12/563,422

(22) Filed: Sep. 21, 2009

(65) Prior Publication Data

US 2010/0077937 A1 Apr. 1, 2010

(30) Foreign Application Priority Data

Sep. 26, 2008 (JP) ................. 2008-247116

(51) Int. Cl.
*C09D 11/02* (2006.01)
(52) U.S. Cl. ................. 106/31.59; 106/31.89
(58) Field of Classification Search .............. 106/31.59, 106/31.89

See application file for complete search history.

(56) References Cited

U.S. PATENT DOCUMENTS

| | | | |
|---|---|---|---|
| 4,985,077 A | 1/1991 | Ise et al. | |
| 5,609,671 A | 3/1997 | Nagasawa | |
| 5,837,045 A | 11/1998 | Johnson et al. | |
| 5,952,414 A | 9/1999 | Noguchi et al. | |
| 2006/0176349 A1 | 8/2006 | Nagai et al. | |
| 2007/0200880 A1 | 8/2007 | Tonishi et al. | |
| 2007/0263058 A1 | 11/2007 | Sao et al. | |
| 2008/0011193 A1 | 1/2008 | Marritt | |

FOREIGN PATENT DOCUMENTS

| | | |
|---|---|---|
| JP | 01-266173 | 10/1989 |
| JP | 03-014881 | 1/1991 |
| JP | 04-153279 | 5/1992 |
| JP | 08-003498 | 1/1996 |
| JP | 08-067840 | 3/1996 |
| JP | 09-111165 | 4/1997 |
| JP | 11-116863 | 4/1999 |
| JP | 11-124524 | 5/1999 |
| JP | 11-166144 | 6/1999 |
| JP | 11-256087 | 9/1999 |
| JP | 2000-513396 | 10/2000 |
| JP | 2005-089713 | 4/2005 |
| JP | 2005205684 A | 8/2005 |
| JP | 2006257184 A | 9/2006 |
| JP | 2006342201 A | 12/2006 |

(Continued)

OTHER PUBLICATIONS

Co-pending U.S. Appl. No. 12/563,549, filed Sep. 21, 2009.

(Continued)

*Primary Examiner* — Jerry A Lorengo
*Assistant Examiner* — Veronica F Faison
(74) *Attorney, Agent, or Firm* — Banner & Witcoff, Ltd.

(57) ABSTRACT

A water base ink for ink-jet recording contains a coloring agent, water, a penetrant, and a surfactant, wherein the penetrant includes diethylene glycol n-hexyl ether (A), the surfactant includes an acetylene glycol-based surfactant (B1) and sodium polyoxyethylene alkyl ether sulfate (B2), and (A), (B1), and (B2) are blended at ratios respectively to fulfill a predetermined condition. Accordingly, the water base ink for ink-jet recording is provided, which is excellent in the permeability, the vaporization characteristic, and the water repellence and which does not deteriorate any resin material forming a casing or the like of an ink jet recording apparatus.

12 Claims, 3 Drawing Sheets

FOREIGN PATENT DOCUMENTS

| | | |
|---|---|---|
| JP | 2007230017 A | 9/2007 |
| JP | 2007254516 A | 10/2007 |
| JP | 2007-302802 | 11/2007 |
| JP | 2007-302810 | 11/2007 |
| JP | 2008-031260 | 2/2008 |
| JP | 2008-120977 | 5/2008 |

OTHER PUBLICATIONS

Notice of Reasons for Rejection for Japanese Patent Application No. 2008-247116 mailed Dec. 2, 2010.

WATER BASE INK FOR INK-JET RECORDING, INK CARTRIDGE, AND INK-JET RECORDING APPARATUS

CROSS REFERENCE TO RELATED APPLICATION

The present application claims priority from Japanese Patent Application No. 2008-247116, filed on Sep. 26, 2008, the disclosure of which is incorporated herein by reference in its entirety.

BACKGROUND OF THE INVENTION

1. Field of the Invention

The present invention relates to a water base ink for ink-jet recording, an ink cartridge, and an ink jet recording apparatus.

2. Description of the Related Art

In recent years, a high printing speed, which is equivalent to that of the laser printing, is required to be realized in the printing on the plain paper or regular paper in the field of the ink-jet printing. A method, in which the printing dot number is decreased for the plain paper to enhance the permeability of the ink, is exemplified as a method for achieving the realization of the high printing speed. The permeability of the ink can be enhanced by adding a penetrant to the ink. For example, an ink has been suggested, in which diethylene glycol n-hexyl ether (DEGHE) is used as the penetrant (see U.S. Pat. No. 4,985,077 (corresponding to Japanese Patent Application Laid-open No. 1-266173), Japanese Patent Application Laid-open No. 3-14881, Japanese Patent Application Laid-open No. 4-153279, Japanese Patent Application Laid-open No. 8-67840, Japanese Patent Application Laid-open No. 11-166144, Japanese Patent Application Laid-open No. 11-256087, U.S. Pat. No. 5,952,414 (corresponding to Japanese Patent Application Laid-open No. 9-111165), United States Patent Application Publication No. 2007/0263058A1 (corresponding to Japanese Patent Application Laid-open No. 2007-302802), Japanese Patent Application Laid-open No. 2007-302810, Japanese Patent Application Laid-open No. 2008-31260, Japanese Patent Application Laid-open No. 2008-120977, Japanese Patent Application Laid-open No. 11-124524, Japanese Patent Application Laid-open No. 11-116863, and United States Patent Application Publication No. 2006/0176349A1 (corresponding to Japanese Patent Application Laid-open No. 2005-89713)).

However, if a large amount of DEGHE is added to the ink, the vaporization characteristic of the ink is deteriorated to cause the solidification of the ink, the precipitation of a coloring agent, and the aggregation (coagulation or cohesion). Consequently, the nozzle of the ink jet head tends to suffer the clog-up, and the discharge failure or undischarge (unsatisfactory discharge) is caused. Further, if a large amount of DEGHE is added to the ink, it is difficult to remove the ink, for example, from a casing or the like when the ink adheres to a resin material forming the casing or the like of an ink-jet recording apparatus; and a state tends to be given, in which ink dirt (stain) adheres to the casing or the like and the ink dirt remains as it is. If the ink adheres and remains as it is for a long period of time, the deterioration of the resin material forming the casing or the like is caused thereby. Further, DEGHE exhibits a poor water solubility. Therefore, a problem arises such that an amount of DEGHE, which is required to obtain the sufficient permeating power (penetrating power), cannot be added into the ink. Further, DEGHE exhibits a low water repellence. Therefore, an ink using DEGHE tends to adhere to a wall surface of the ink cartridge. Such an ink causes such a problem that the residual amount of the ink cannot be confirmed from the outside and such a problem that the ink is wasted.

SUMMARY OF THE INVENTION

In view of the above, an object of the present invention is to provide a water base ink for ink-jet recording which is excellent in the permeability, the vaporization characteristic, and the water repellence and which does not deteriorate the resin material forming the casing or the like of the ink jet recording apparatus.

According to a first aspect of the present invention, there is provided a water base ink for ink jet recording containing a coloring agent, water, a penetrant, and a surfactant, wherein:

the penetrant includes diethylene glycol n-hexyl ether (A);

the surfactant includes an acetylene glycol-based surfactant (B1) and sodium polyoxyethylene alkyl ether sulfate (B2); and (A), (B1), and (B2) are blended at ratios respectively to fulfill at least one condition of the following conditions (a) to (d):

condition (a): all of expressions (a1) to (a5) hold:

$$x \geq 0.05 \tag{a1}$$

$$40.3x + 228.15y - 146.25z + 81.9325 \geq 0 \tag{a2}$$

$$124.6x + 22.05y - 78.75z - 6.0725 \leq 0 \tag{a3}$$

$$y \geq 2x/9 + 3.05/9 \tag{a4}$$

$$y \leq -x/3 + 1.85/3 \tag{a5}$$

condition (b): all of expressions (b1) to (b5) hold:

$$x \leq 0.50 \tag{b1}$$

$$56x + 63y - 112.5z + 101.15 \geq 0 \tag{b2}$$

$$2.002x + 2.646y - 1.575z - 0.8687 \leq 0 \tag{b3}$$

$$y \geq -x/3 + 1.1/3 \tag{b4}$$

$$y \leq 2x/9 + 3.05/9 \tag{b5}$$

condition (c): all of expressions (c1) to (c5) hold:

$$x \geq 0.50 \tag{c1}$$

$$2.8x - 14y + 25z - 30.1 \leq 0 \tag{c2}$$

$$12.6x + 42y - 25z - 4.2 \leq 0 \tag{c3}$$

$$y \geq x/5 + 0.1 \tag{c4}$$

$$y \leq -3x/10 + 0.6 \tag{c5}$$

condition (d): all of expressions (d1) to (d5) hold:

$$x \leq 1.00 \tag{d1}$$

$$14x - 70y + 75z - 87.5 \leq 0 \tag{d2}$$

$$1.4x + 14y - 5z - 1.4 \leq 0 \tag{d3}$$

$$y \geq -x/10 + 0.25 \tag{d4}$$

$$y \leq x/5 + 0.1 \tag{d5}$$

wherein:

x: blending amount (% by weight) of (A) with respect to a total amount of the ink;

y: blending amount (% by weight) of (B1) with respect to the total amount of the ink;

z: blending amount (% by weight) of (B2) with respect to the total amount of the ink.

In the present invention, the phrase "fulfill at least one condition of the conditions (a) to (d)" means that one condition or two or three conditions of the conditions (a) to (d) is/are fulfilled.

The inventors of the present invention found out, through a series of researches performed by the inventors, that an ink, which is excellent in the permeability, the vaporization characteristic, and the water repellence and which does not deteriorate any resin material forming a casing or the like of an ink-jet recording apparatus, is obtained such that DEGHE (A) is used as the penetrant for the water base ink for ink-jet recording, the acetylene glycol-based surfactant (B1) and sodium polyoxyethylene alkyl ether sulfate (B2) are contained in the ink, and (A), (B1), and (B2) are blended at the ratios to fulfill at least one condition of the conditions (a) to (d). Thus, the present invention has been completed.

According to a second aspect of the present invention, there is provided a water base ink for ink-jet recording containing a coloring agent, water, a penetrant, and a surfactant, wherein:

the penetrant includes diethylene glycol n-hexyl ether;

the surfactant includes an acetylene glycol-based surfactant and sodium polyoxyethylene alkyl ether sulfate; and x, y, and z are included in a tetradecahedron defined by the following coordinates c1 to c12 provided that x, y, and z represent blending ratios (% by weight) of the diethylene glycol n-hexyl ether, the acetylene glycol-based surfactant and the sodium polyoxyethylene alkyl ether sulfate in the water base ink for ink-jet recording respectively:

c1 (0.05, 0.60, 1.51)
c2 (0.05, 0.60, 0.17)
c3 (0.05, 0.35, 1.12)
c4 (0.05, 0.35, 0.10)
c5 (0.50, 0.45, 1.40)
c6 (0.50, 0.45, 0.84)
c7 (0.50, 0.20, 0.42)
c8 (0.50, 0.20, 1.26)
c9 (1.00, 0.30, 0.84)
c10 (1.00, 0.30, 1.26)
c11 (1.00, 0.15, 0.42)
c12 (1.00, 0.15, 1.12)

BRIEF DESCRIPTION OF THE DRAWINGS

FIG. 2 (FIGS. 2A and 2B) is a perspective view of an exemplary ink cartridge of the present invention.

FIG. 4 (FIGS. 4A and 4B) illustrates a method for evaluating the water repellence as referred to in an embodiment of the present invention.

DESCRIPTION OF THE PREFERRED EMBODIMENTS

In the present invention, the term "water repellence of the ink" means such a property of the ink that the ink is repelled by the wall surface (surface) of the ink cartridge when, for example, the ink is brought in contact with the wall surface of the ink cartridge. As the water repellence is higher, the ink is less likely adhere to the wall surface of the cartridge.

Figure 1:
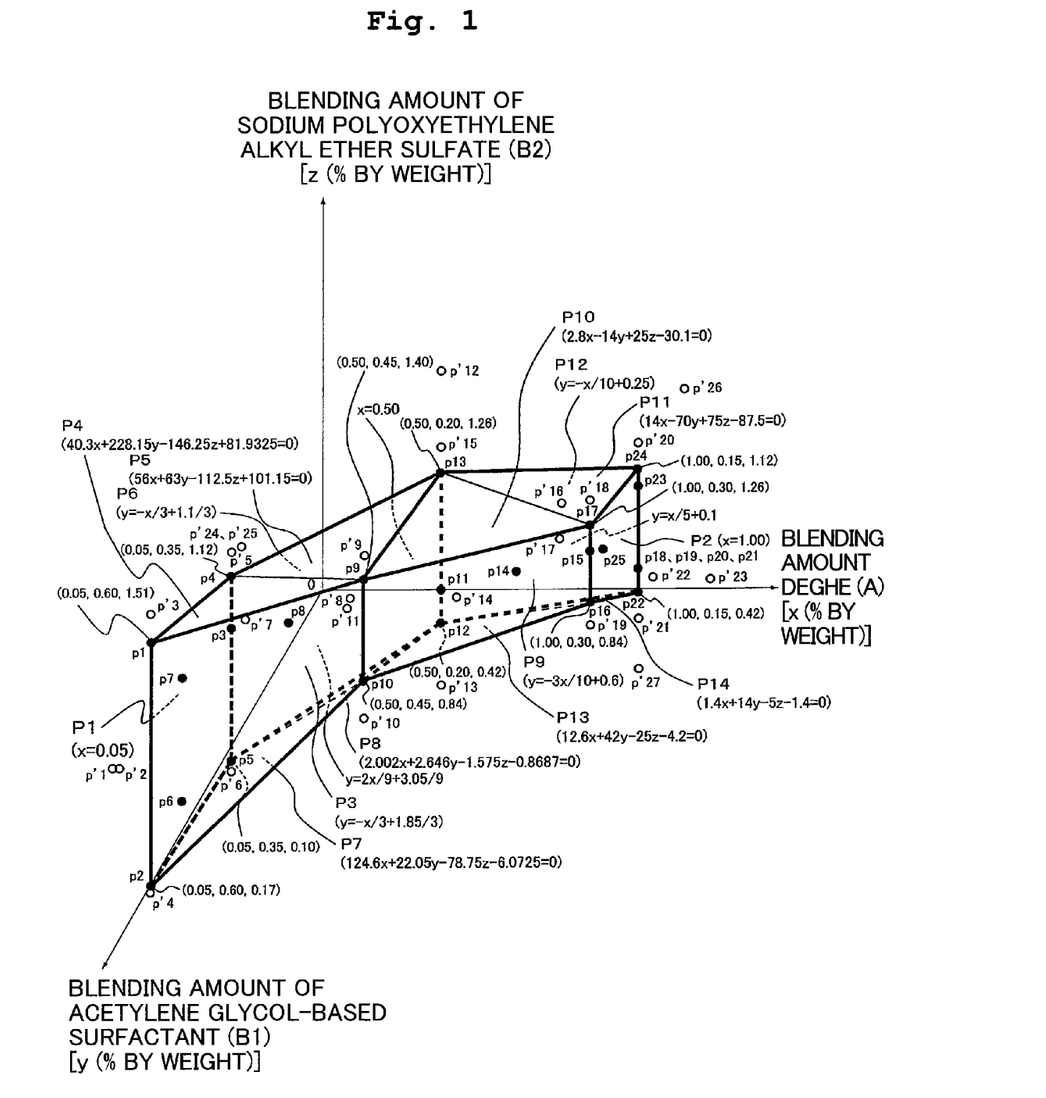
FIG. 1 illustrates a blending amount (x) of diethylene glycol n-hexyl ether, a blending amount (y) of acetylene glycol-based surfactant, and a blending amount (z) of sodium polyoxyethylene alkyl ether sulfate in the water base ink for ink-jet recording according to the present invention.

The blending amount (x) of (A), the blending amount (y) of (B1), and the blending amount (z) of (B2) with respect to the total amount of the ink, which are contained in the water base ink for ink-jet recording of the present invention, are included in a space surrounded by planes P1 to P14 of the xyz coordinate system shown in FIG. 1, i.e., in the interior of the tetradecahedron or tetrakaidecahedron (14-sided polyhedron) having the boundary surfaces P1 to P14.

The x axis, the y axis, and the z axis shown in FIG. 1 herein represent the blending amounts (% by weight) of (A), (B1), and (B2), respectively, with respect to the total amount of the ink. The compositions (% by weight) of (A), (B1), and (B2) can be expressed as the coordinates (x, y, z) in the xyz coordinate system composed of the x axis, the y axis, and the z axis. In FIG. 1, the coordinates, which are expressed by p1 to p25, represent the compositions of (A), (B1), and (B2) in Examples as described later on respectively; and the coordinates, which are expressed by p'1 to p'27, represent the compositions of (A), (B1), and (B2) in Comparative Examples as described later on respectively.

In FIG. 1, P1 represents a quadrangle having apexes of coordinates p1, p2, p4, p5. An equation of the plane including P1 can be determined as x=0.05 by the calculation based on the values of the coordinates p1, p2, p4, p5. P2 represents a quadrangle having apexes of coordinates p16, p17, p22, p24. An equation of the plane including P2 can be determined as x=1.00 by the calculation based on the values of the coordinates p16, p17, p22, p24. P3 represents a quadrangle having apexes of coordinates p1, p2, p9, p10. An equation of the plane including P3 can be determined as y=−x/3+1.85/3 by the calculation based on the values of the coordinates p1, p2, p9, p10. P4 represents a triangle having apexes of coordinates p1, p4, p9. An equation of the plane including P4 can be determined as 40.3x+228.15y−146.25z+81.9325=0 by the calculation based on the values of the coordinates p1, p4, p9. P5 represents a triangle having apexes of coordinates p4, p9, p13. An equation of the plane including P5 can be determined as 56x+63y−112.5z+101.15=0 by the calculation based on the values of the coordinates p4, p9, p13. P6 represents a quadrangle having apexes of coordinates p4, p5, p12, p13. An equation of the plane including P6 can be determined as y=−x/3+1.1/3 by the calculation based on the values of the coordinates p4, p5, p12, p13. P7 represents a triangle having apexes of coordinates p2, p5, p10. An equation of the plane including P7 can be determined as 124.6x+22.05y−78.75z−6.0725=0 by the calculation based on the values of the coordinates p2, p5, p10. P8 represents a triangle having apexes of coordinates p5, p10, p12. An equation of the plane including P8 can be determined as 2.002x+2.646y−1.575z−0.8687=0 by the calculation based on the values of the coordinates p5, p10, p12. P9 represents a quadrangle having apexes of coordinates p9, p10, p16, p17. An equation of the plane including P9 can be determined as y=−3x/10+0.6 by the calculation based on the values of the coordinates p9, p10, p16, p17. P10 represents a triangle having apexes of coordinates p9, p13, p17. An equation of the plane including P10 can be determined as 2.8x−14y+25z−30.1=0 by the calculation based on the values of the coordinates p9, p13, p17. P11 represents a triangle having apexes of coordinates p13, p17, p24. An equation of the plane including P11 can be determined as 14x−70y+75z−87.5=0 by the calculation based on the values of the coordinates p13, p17, p24. P12 represents a quadrangle having apexes of coordinates p12, p13, p22, p24. An equation of the plane including P12 can be determined as y=−x/10+0.25 by the calculation based on the values of the coordinates p12, p13, p22, p24. P13 represents a triangle having apexes of coordinates p10, p12, p16. An equation of the plane including P13 can be determined as 12.6x+42y−25z−4.2=0 by the calculation based on the values of the coordinates p10, p12, p16. P14 represents a triangle having apexes of coordinates p12, p16, p22. An equation of the plane including P14 can be determined as 1.4x+14y−5z−1.4=0 by the calculation based on the values of the coordinates p12, p16, p22.

In this case, the tetradecahedron, which has the boundary surfaces of P1 to P14, can be divided into four pentahedrons, i.e., a pentahedron p1p4p9-p2p5p10, a pentahedron p4p9p13-p5p10p12, a pentahedron p9p13p17-p10p12p16, and a pentahedron p13p17p24-p12p16p22. Therefore, the fact that the coordinates (x, y, z), which represent the compositions of (A), (B1), and (B2), are included in the tetradecahedron having the boundary surfaces of P1 to P14 means that the coordinates (x, y, z) are included in at least one of the pentahedron p1p4p9-p2p5p10, the pentahedron p4p9p13-p5p10p12, the pentahedron p9p13p17-p10p12p16, and the pentahedron p13p17p24-p12p16p22.

An equation of the boundary surface between the pentahedron p1p4p9-p2p5p10 and the pentahedron p4p9p13-p5p10p12 can be determined as y=2x/9+3.05/9 by the calculation based on the values of the coordinates p4, p5, p9, p10 on the boundary surface. Similarly, an equation of the boundary surface between the pentahedron p4p9p13-p5p10p12 and the pentahedron p9p13p17-p10p12p16 can be determined as x=0.50 by the calculation based on the values of the coordinates p9, p10, p12, p13 on the boundary surface. Further, an equation of the boundary surface between the pentahedron p9p13p17-p10p12p16 and the pentahedron p13p17p24-p12p16p22 can be determined as y=x/5+0.1 by the calculation based on the values of the coordinates p12, p13, p16, p17 on the boundary surface.

Therefore, the coordinates (x, y, z), which are included in the pentahedron p1p4p9-p2p5p10, fulfill all of the following expressions (a1) to (a5) (hereinafter referred to as "condition (a)"):

$$x \geq 0.05 \tag{a1}$$

$$40.3x+228.15y-146.25z+81.9325 \geq 0 \tag{a2}$$

$$124.6x+22.05y-78.75z-6.0725 \leq 0 \tag{a3}$$

$$y \geq 2x/9+3.05/9 \tag{a4}$$

$$y \leq -x/3+1.85/3 \tag{a5}$$

Further, the coordinates (x, y, z), which are included in the pentahedron p4p9p13-p5p10p12, fulfill all of the following expressions (b1) to (b5) (hereinafter referred to as "condition (b)"):

$$x \leq 0.50 \tag{b1}$$

$$56x+63y-112.5z+101.15 \geq 0 \tag{b2}$$

$$2.002x+2.646y-1.575z-0.8687\ 5 \leq 0 \tag{b3}$$

$$y \geq -x/3+1.1/3 \tag{b4}$$

$$y \leq 2x/9+3.05/9 \tag{b5}$$

Further, the coordinates (x, y, z), which are included in the pentahedron p9p13p17-p10p12p16, fulfill all of the following expressions (c1) to (c5) (hereinafter referred to as "condition (c)"):

$$x \geq 0.50 \tag{c1}$$

$$2.8x-14y+25z-30.1 \leq 0 \tag{c2}$$

$$12.6x+42y-25z-4.2 \leq 0 \tag{c3}$$

$$y \geq x/5+0.1 \tag{c4}$$

$$y \leq -3x/10+0.6 \tag{c5}$$

Further, the coordinates (x, y, z), which are included in the pentahedron p13p17p24-p12p16p22, fulfill all of the following expressions (d1) to (d5) (hereinafter referred to as "condition (d)"):

$$x \leq 1.00 \tag{d1}$$

$$14x-70y+75z-87.5 \leq 0 \tag{d2}$$

$$1.4x+14y-5z-1.4 \leq 0 \tag{d3}$$

$$y \geq -x/10+0.25 \tag{d4}$$

$$y \leq x/5+0.1 \tag{d5}$$

In the water base ink for ink-jet recording of the present invention, it is preferable that (B1) includes an acetylene glycol-based surfactant represented by the following general formula (1):

wherein:

m and n are numbers which fulfill m+n=0 to 20, m and n may be identical with each other or different from each other;

each of $R^1$, $R^2$, $R^3$, and $R^4$ is a straight chain or branched chain alkyl group having a number of carbon atom or atoms of 1 to 5, and $R^1$, $R^2$, $R^3$, and $R^4$ may be identical with each other or different from each other in the general formula (1).

In the water base ink for ink-jet recording of the present invention, it is preferable that a polymerization degree of polyoxyethylene of (B2) is 0 to 9.

In the water base ink for ink jet recording of the present invention, it is preferable that an alkyl group of (B2) is a straight chain alkyl group having a number of carbon atoms of 10 to 16.

According to the present invention, there is provided an ink cartridge containing a water base ink for ink-jet recording, wherein the ink is the water base ink for ink jet recording of the present invention.

It is preferable that the ink cartridge of the present invention is formed of at least one resin selected from the group consisting of polypropylene (PP), polyethylene (PE), acrylonitrile-butadiene-styrene copolymer synthetic resin (ABS resin), acrylonitrile-ethylene-styrene copolymer synthetic resin (AES resin), and polystyrene (PS). In particular, it is preferable that the ink cartridge of the present invention is formed of polypropylene (PP).

According to the present invention, there is provided an ink-jet recording apparatus including an ink cartridge and an ink discharge section, the ink-jet recording apparatus discharging an ink contained in the ink cartridge from the ink discharge section, wherein the ink cartridge is the ink cartridge of the present invention.

Next, the water base ink for ink jet recording of the present invention will be explained in detail. The water base ink for ink-jet recording of the present invention (hereinafter simply referred to as "ink" in some cases) contains a coloring agent, water, a penetrant, and a surfactant.

The coloring agent is not specifically limited. The coloring agent may be any one of a pigment and a dye. A mixture, which is obtained by mixing the pigment and the dye, may be used as the coloring agent.

The pigment is not limited. Those usable include, for example, carbon black, inorganic pigments, and organic pigments. The carbon black includes, for example, furnace black, lamp black, acetylene black, and channel black. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Any other pigment is also usable provided that the pigment is dispersible in the water phase. The pigments as described above include, for example, C. I. Pigment Blacks 1, 6, and 7; C. I. Pigment Yellows 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The pigment may include self-dispersible pigments. The self-dispersible pigment is dispersible in water without using any dispersing agent, for example, owing to the fact that at least one of the hydrophilic functional group and the salt thereof including, for example, carboxyl group, carbonyl group, hydroxyl group, and sulfon group is introduced into the surfaces of the pigment particles by the chemical bond directly or with any polyvalent group intervening therebetween.

The self-dispersible pigment is not limited. It is possible to use self-dispersible pigments subjected to the surface treatment by any one of methods described, for example, in U.S. Pat. No. 5,609,671 (corresponding to Japanese Patent Application Laid-open No. 8-3498) and U.S. Pat. No. 5,837,045 (corresponding to Published Japanese Translation of PCT International Publication for Patent Application No. 2000-513396). For example, any commercially available product may be used for the self-dispersible pigment. The commercially available product includes, for example, "CAB-O-JET (trade name) 200", "CAB-O-JET (trade name) 250", "CAB-O-JET (trade name) 260", "CAB-β-JET (trade name) 270", "CAB-O-JET (trade name) 300", and "CAB-O-JET (trade name) 700" produced by Cabot Specialty Chemicals; "BONJET (trade name) BLACK CW-1", "BONJET (trade name) BLACK CW-2", and "BONJET (trade name) BLACK CW-3" produced by Orient Chemical Industries, Ltd.; and "LIOJET (trade name) WD BLACK 002C" produced by Toyo Ink Mfg. Co., Ltd.

The pigment, which is usable as the raw material for the self-dispersible pigment, is not limited. It is possible to use any one of inorganic pigments and organic pigments. The pigment, which is suitable to perform the surface treatment, includes, for example, carbon blacks such as "MA8" and "MA100" produced by Mitsubishi Chemical Corporation and "Color Black FW200" produced by Degussa.

The blending amount of the pigment (pigment ratio) with respect to the total amount of the ink is not limited, and can be appropriately determined depending on, for example, a desired optical density and coloration or colorfulness. The pigment ratio is, for example, 0.1% by weight to 20% by weight, preferably 1% by weight to 10% by weight, and more preferably 2% by weight to 8% by weight. One type of the pigment as described above may be used singly, or two or more types of the pigments as described above may be used in combination.

The dye is not limited, and includes, for example, direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black includes, for example, C. I. Direct Blacks 17, 19, 32, 51, 71, 108, 146, 154, and 168. C. I. Direct Blue includes, for example, C. I. Direct Blues 6, 22, 25, 71, 86, 90, 106, and 199. C. I. Direct Red includes, for example, C. I. Direct Reds 1, 4, 17, 28, 83, and 227. C. I. Direct Yellow includes, for example, C. I. Direct Yellows 12, 24, 26, 86, 98, 132, and 142. C. I. Direct Orange includes, for example, C. I. Direct Oranges 34, 39, 44, 46, and 60. C. I. Direct Violet includes, for example, C. I. Direct Violets 47 and 48. C. I. Direct Brown includes, for example, C. I. Direct Brown 109. C. I. Direct Green includes, for example, C. I. Direct Green 59. C. I. Acid Black includes, for example, C. I. Acid Blacks 2, 7, 24, 26, 31, 52, 63, 112, and 118. C. I. Acid Blue includes, for example, C. I. Acid Blues 9, 22, 40, 59, 93, 102, 104, 117, 120, 167, 229, and 234. C. I. Acid Red includes, for example, C. I. Acid Reds 1, 6, 32, 37, 51, 52, 80, 85, 87, 92, 94, 115, 180, 256, 289, 315, and 317. C. I. Acid Yellow includes, for example, C. I. Acid Yellows 11, 17, 23, 25, 29, 42, 61, and 71. C. I. Acid Orange includes, for example, C. I. Acid Oranges 7 and 19. C. I. Acid Violet includes, for example, C. I. Acid Violet 49. C. I. Basic Black includes, for example, C. I. Basic Black 2. C. I. Basic Blue includes, for example, C. I. Basic Blues 1, 3, 5, 7, 9, 24, 25, 26, 28, and 29. C. I. Basic Red includes, for example, C. I. Basic Reds 1, 2, 9, 12, 13, 14, and 37. C. I. Basic Violet includes, for example, C. I. Basic Violets 7, 14, and 27. C. I. Food Black includes, for example, C. I. Food Blacks 1 and 2. The dyes as described above are excellent, for example, in the characteristics such as the vividness, the water solubility, and the stability.

The blending amount of the dye (dye ratio) with respect to the total amount of the ink is not limited, which is, for example, 0.1% by weight to 20% by weight, preferably 1% by weight to 10% by weight, and more preferably 2% by weight to 8% by weight. One type of the dye as described above may be used singly, or two or more types of the dyes as described above may be used in combination.

Water is preferably ion-exchanged water or pure water (purified water). The blending ratio of water (water ratio) with respect to the total amount of the ink is appropriately determined depending on, for example, the desired ink characteristics. The water ratio may be, for example, the balance of the other components.

The penetrant includes diethylene glycol n-hexyl ether (DEGHE: (A)). The penetrant adjusts, for example, the drying speed of the ink on the surface of the recording medium. The blending amount of (A) ((A) ratio) is 0.05% by weight to 1% by weight with respect to the total amount of the ink as appreciated from the conditions (a) to (d) described above. By making the (A) ratio be within the range described above, it is possible to obtain the ink which is excellent in the permeability and the vaporization characteristic and which does not deteriorate any resin material forming, for example, the casing or the like of the ink jet recording apparatus.

The surfactant includes the acetylene glycol-based surfactant (B1) and sodium polyoxyethylene alkyl ether sulfate (B2).

(B1) is not limited. However, as described above, it is preferable to include the acetylene glycol-based surfactant represented by the general formula (1). In the general formula (1), m and n are, for example, numbers which fulfill m+n=0 to 50, and preferably numbers which fulfill m+n=0 to 20. The alkyl group includes, for example, methyl group, ethyl group, propyl group, isopropyl group, butyl group, and isobutyl group. Preferably, the alkyl group is methyl group or isobutyl group.

For example, any commercially available product may be used for (B1). The commercially available product includes, for example, "Olfin (trade name) E1004", "Olfin (trade name) E1010", "Surfynol (trade name) 440", and "Surfynol (trade name) 465" produced by Nissin Chemical Industry Co., Ltd.; and "Acetylenol (trade name) E40" and "Acetylenol (trade name) E100" produced by Kawaken Fine Chemicals Co., Ltd.

The blending amount of (B1) ((B1) ratio) with respect to the total amount of the ink is not limited, provided that the blending amount of (B1) ((B1) ratio) fulfils at least one condition of the conditions (a) to (d) described above. The blending amount of (B1) ((B1) ratio) is, for example, 0.001% by weight to 20% by weight. By making the (B1) ratio be within the range described above, it is possible to obtain the ink which is excellent in the permeability and the vaporization characteristic. The (B1) ratio is preferably 0.01% by weight to 10% by weight.

(B2) is exemplified, for example, by compounds represented by the general formula (2).

$$R^5\!-\!O(CH_2CH_2O)_x\!-\!SO_3Na \qquad (2)$$

In the general formula (2), $R^5$ is, for example, a straight chain alkyl group having a number of carbon atoms of 10 to 18, and preferably a straight chain alkyl group having a number of carbon atoms of 10 to 16, and x (polymerization degree of polyoxyethylene) is, for example, 0 to 15, and preferably 0 to 9. The average of x (average polymerization degree of polyoxyethylene) is 1 to 4.

For example, any commercially available product may be used for (B2). The commercially available product includes, for example, "SUNNOL (trade name) NL1430" produced by Lion Corporation; "EMAL (trade name) 20C", "EMAL (trade name) E-27E", "EMAL (trade name) 327", and "LATEMUL (trade name) E-150" produced by Kao Corporation; and "BEAULIGHT (trade name) NA-25S" produced by Sanyo Chemical Industries, Ltd.

The blending amount of (B2) ((B2) ratio) with respect to the total amount of the ink is not limited, provided that the blending amount of (B2) ((B2) ratio) fulfils at least one condition of the conditions (a) to (d) described above. The blending amount of (B2) ((B2) ratio) is, for example, 0.001% by weight to 20% by weight. By making the (B2) ratio be within the range described above, it is possible to obtain the ink which is excellent in the water repellence. The (B2) ratio is preferably 0.01% by weight to 10% by weight.

The water base ink for ink-jet recording of the present invention may contain any surfactant other than (B1) and (B2) within a range in which the effect of the present invention is not deteriorated. The surfactant other than (B1) and (B2) is not limited, which includes, for example, anionic surfactants produced by Kao Corporation, i.e., "EMAL (trade name)" series, "LATEMUL (trade name)" series, "VENOL (trade name)" series, "NEOPELEX (trade name)" series, NS SOAP, KS SOAP, OS SOAP, "PELEX (trade name)" series and the like; anionic surfactants produced by Lion Corporation, i.e., "LIPOLAN (trade name)" series, "LIPON (trade name)" series, "SUNNOL (trade name)" series, "LIPOTAC (trade name)" series, "ENAGICOL (trade name)" series, "LIPAL (trade name)" series, "LOTAT (trade name)" series and the like; nonionic surfactants produced by Kao Corporation, i.e., "EMULGEN (trade name)" series, "RHEODOL (trade name)" series, "EMASOL (trade name)" series, "EXCEL (trade name)" series, "EMANON (trade name)" series, "AMIET (trade name)" series, "AMINON (trade name)" series and the like; and nonionic surfactants produced by Lion Corporation, i.e., "DOBANOX (trade name)" series, "LEOCOL (trade name)" series, "LEOX (trade name)" series, "LAOL (trade name)" series, "LEOCON (trade name)" series, "LIONOL (trade name)" series, "CADENAX (trade name)" series, "LIONON (trade name)" series, "LEOFAT (trade name)" series and the like. Only one type of the surfactant other than (B1) and (B2) as described above may be used, or two or more types of the surfactants other than (B1) and (B2) as described above may be used.

The water base ink for ink-jet recording of the present invention preferably further contains a moistening agent. The moistening agent prevents, for example, the ink from being dried at an end portion (forward end portion) of the ink-jet head.

The moistening agent is not limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketone alcohols such as diacetone alcohol; ethers such as tetrahydrofuran and dioxane; polyvalent alcohols such as polyalkylene glycols, alkylene glycols, and glycerol; 2-pyrrolidone; N-methyl-2-pyrrolidone; and 1,3-dimethyl-2-imidazolidinone. The polyalkylene glycol is not limited, which includes, for example, polyethylene glycol and polypropylene glycol. The alkylene glycol is not limited, which includes, for example, ethylene glycol, propylene glycol, butylenes glycol, diethylene glycol, triethylene glycol, dipropylene glycol, tripropylene glycol, thiodiglycol, and hexylene glycol. In particular, it is preferable to use polyvalent alcohols such as alkylene glycol and glycerol. One type of the moistening agent as described above may be used singly, or two or more types of the moistening agents as described above may be used in combination.

The blending ratio (moistening agent ratio) of the moistening agent with respect to the total amount of the ink is not specifically limited. The blending ratio (moistening agent ratio) is, for example, 0% by weight to 95% by weight, preferably 10% by weight to 80% by weight, and more preferably 10% by weight to 50% by weight.

The water base ink for ink jet recording of the present invention may further contain a conventionally known additive, if necessary. The additive includes, for example, viscosity-adjusting agents, surface tension-adjusting agents, and fungicides. The viscosity-adjusting agent is not limited, which includes, for example, polyvinyl alcohol, cellulose, and water-soluble resin.

The water base ink for ink-jet recording of the present invention can be prepared, for example, such that the coloring agent, water, the penetrant, the surfactant, and optionally other additive components are mixed uniformly or homogeneously by any conventionally known method, and undissolved matters are removed by a filter or the like.

As described above, in the water base ink for ink-jet recording of the present invention, DEGHE (A) is used as the penetrant, the acetylene glycol-based surfactant (B1) and the sodium polyoxyethylene ether sulfate (B2) are contained, and (A), (B1), and (B2) are blended at the ratios to fulfill at least one condition of the conditions (a) to (d) described above. When the blending amount of (A) is increased, the permeability is improved. However, the water repellence is lowered, and the resin material forming the casing or the like of the ink-jet recording apparatus is easily deteriorated. When (A) and (B1) are used in combination, the permeability is further improved or enhanced. However, the vaporization characteristic and the water repellence are lowered. When (B2) is added to (A) and (B1), the water repellence is improved. However, especially when the blending amount of (B2) is increased, the vaporization characteristic is lowered. In this way, the blending amounts of (A), (B1), and (B2) greatly affect the characteristics of the ink to be obtained. In such circumstances, in the water base ink for ink-jet recording of the present invention, as described above, (A), (B1), and (B2) are blended at the ratios to fulfill at least one condition of the conditions (a) to (d) described above. Accordingly, (A), (B1), and (B2) exhibit the respective characteristics, and the synergistic effect of (A), (B1), and (B2) is generated. As a result, in the water base ink for ink jet recording of the present invention, as described above, the high permeability, vaporization characteristic and water repellence are achieved. Further, the resin material forming the casing or the like of the ink-jet recording apparatus is not deteriorated.

It is preferable that the viscosity of the water base ink for ink jet recording of the present invention is 2.8 mPa·s to 3.2 mPa·s. The viscosity of the ink can be measured, for example, by a rotational viscometer. The rotational viscometer includes, for example, a rotational viscometer (for example, type: DV-II+) produced by BROOKFIELD. The measurement condition is, for example, a temperature: 25° C. and a number of revolutions: 60 revolutions/minute.

Next, the ink cartridge of the present invention will be explained. As described above, the ink cartridge of the present invention is an ink cartridge containing a water base ink for ink-jet recording, wherein the ink is the water base ink for ink-jet recording of the present invention. For example, any conventionally known member can be used as the body of the ink cartridge of the present invention.

Figure 2A:
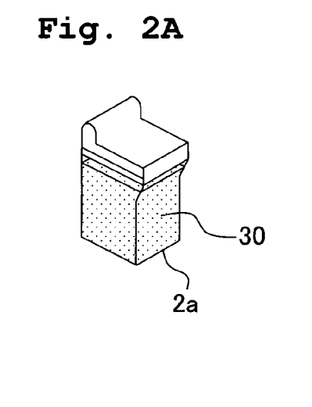
Figure 2B:
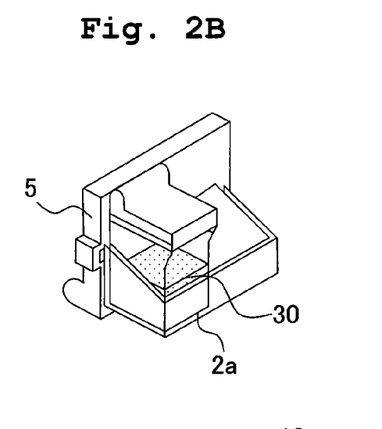

FIG. 2 (FIGS. 2A and 2B) shows an example of the ink cartridge of the present invention. FIG. 2A shows an ink cartridge 2a before the start of the use (before being provided on or attached to an ink jet recording apparatus), and FIG. 2B shows the ink cartridge 2a during the use as being provided on a carriage 5 of the ink-jet recording apparatus. As shown in FIG. 2, the ink cartridge 2a of the present invention is filled with the water base ink for ink jet recording of the present invention which is excellent in the water repellence. Therefore, the ink 30 hardly adheres to the wall surface of the ink cartridge 2a; and it is easy to confirm the residual amount of the ink from the outside, and the ink is not wasted.

Preferably, the ink cartridge is formed of a resin including, for example, polypropylene (PP), polyethylene (PE), ABS resin, AES resin, and polystyrene (PS). Especially preferably, the ink cartridge is formed of polypropylene (PP).

Next, the ink jet recording apparatus of the present invention will be explained. The ink-jet recording apparatus of the present invention is an ink jet recording apparatus including an ink cartridge and an ink discharge section, and the ink-jet recording apparatus discharges an ink contained in the ink cartridge from the ink discharge section, wherein the ink cartridge is the ink cartridge of the present invention. Except for this feature, the construction of the ink jet recording apparatus of the present invention may be same as or equivalent to the construction of, for example, any conventionally known ink-jet recording apparatus.

Figure 3:
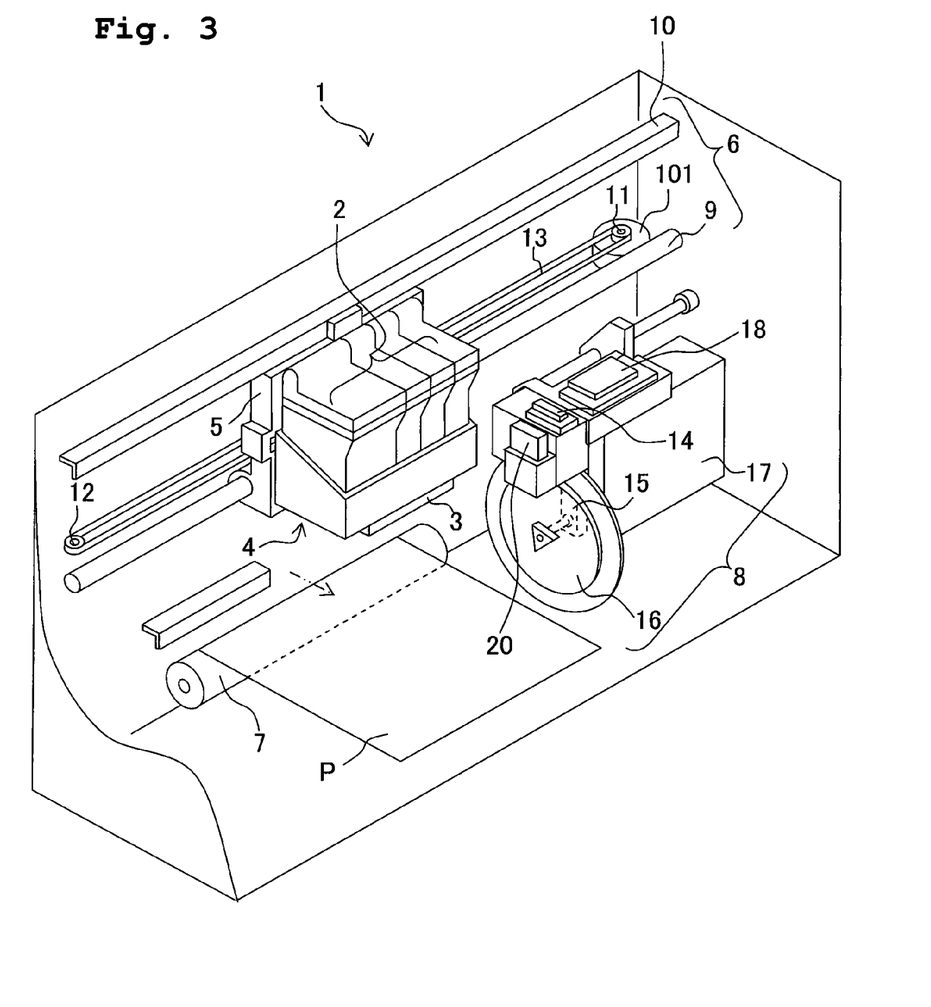
FIG. 3 is a schematic perspective view of an exemplary construction of an ink-jet recording apparatus of the present invention.

As shown in FIG. 3, the ink jet recording apparatus 1 includes, as main constitutive members, four ink cartridges 2, an ink-jet head 3, a head unit 4, a carriage 5, a driving unit 6, a platen roller 7, and a purge unit 8.

Each of the four ink cartridges 2 contains each one of the inks of four colors of yellow, magenta, cyan, and black. For example, the four ink cartridges 2 are the ink cartridges of the present invention. The ink jet head 3 performs the printing on a recording medium P such as a recording paper. The head unit 4 is provided with the ink-jet head 3. The four ink cartridges 2 and the head unit 4 are provided on the carriage 5. The driving unit 6 reciprocatively moves the carriage 5 in a linear direction. The platen roller 7 extends in the reciprocating direction of the carriage 5, and the platen roller 7 is arranged to be opposite to or to face the ink-jet head 3.

The driving unit 6 includes a carriage shaft 9, a guide plate 10, two pulleys 11, 12, and an endless belt 13. The carriage shaft 9 is arranged at a lower end portion of the carriage 5, and the carriage shaft 9 extends in parallel to the platen roller 7. The guide plate 10 is arranged at an upper end portion of the carriage 5, and the guide plate 10 extends in parallel to the carriage shaft 9. The two pulleys 11, 12 are arranged at both end portions of the carriage shaft 9 and between the carriage shaft 9 and the guide plate 10. The endless belt 13 is allowed to travel between the two pulleys 11, 12.

In the ink-jet recording apparatus 1, when the pulley 11 is rotated positively or reversely by the driving of a carriage motor 101, the carriage 5, which is joined to the endless belt 13, is reciprocatively moved in the linear direction along the carriage shaft 9 and the guide plate 10 in accordance with the positive or reverse rotation of the pulley 11.

The recording medium P is fed from a paper feed cassette (not shown) provided at a side portion or a lower portion of the ink-jet recording apparatus 1. The recording mechanism P is introduced into the space between the ink jet head 3 and the platen roller 7. Accordingly, a predetermined printing is performed with the inks discharged from the ink-jet head 3 on the recording medium P. The recording medium P is then discharged from the ink jet recording apparatus 1. In FIG. 3, a paper feed mechanism and a paper discharge mechanism for the recording medium P are omitted from the illustration.

The purge unit 8 is provided on the side of the platen roller 7. The purge unit 8 is arranged so that the purge unit 8 is opposite to or facing the ink-jet head 3 when the head unit 4 is at a reset position (located over or above the purge unit 8 in this embodiment). The purge unit 8 includes a purge cap 14, a pump 15, a cam 16, and an ink storage section 17. The purge cap 14 covers a plurality of nozzles (not shown) of the ink-jet head 3 when the head unit 4 is at the reset position. The pump 15 sucks any defective ink containing bubbles or the like stored or accumulated in the ink-jet head 3, in accordance with the driving of the cam 16. Accordingly, the ink-jet head is restored. The sucked defective ink is stored in the ink storage section 17.

A wiper member 20 is arranged in the purge unit 8 at a position on the side of the platen roller 7 such that the wiper member 20 is adjacent to the purge unit 8. The wiper member 20 is formed to have a spatula-shaped form. The wiper member 20 performs wiping for a nozzle-formed surface of the ink-jet head 3 in accordance with the movement of the carriage 5. With reference to FIG. 3, the cap 18 covers the plurality of nozzles of the ink-jet head 3 which is returned to the reset position when the printing is completed, in order to prevent the ink from being dried.

In the ink-jet recording apparatus 1 of this embodiment, the four ink cartridges 2 are provided on one carriage 5. However, the present invention is not limited to this. In the ink-jet recording apparatus of the present invention, the four ink cartridges may be provided on a plurality of carriages. The ink cartridges may be arranged and fixed in the ink-jet recording apparatus without being provided on the carriage. In such an aspect, for example, the ink cartridges are connected to the head unit provided on the carriage, for example, by tubes, and the inks are supplied from the ink cartridges to the head unit.

The ink-jet recording apparatus of the present invention may be the serial type ink-jet recording apparatus shown in FIG. 3, or the ink-jet recording apparatus of the present invention may be a line type ink-jet recording apparatus. The line type ink-jet recording apparatus includes a line type ink-jet head which has a printing width of not less than a width of the recording medium such as the recording paper; and the ink-jet recording apparatus is capable of collectively performing the printing in the widthwise direction on the recording medium in a state in which the ink-jet head is fixed. On the other hand, as shown in FIG. 3, the serial type ink-jet recording apparatus performs the printing while allowing the ink-jet head itself to move in the widthwise direction on the surface of the recording medium. The line type ink-jet recording apparatus has a wide printing width in which the printing can be performed simultaneously. Therefore, the printing speed is extremely fast as compared with the serial type ink-jet recording apparatus. The water base ink for ink-jet recording and the ink cartridge of the present invention are excellent in the permeability of the ink. Therefore, by using the water base ink for ink-jet recording and the ink cartridge of the present invention for the line type ink-jet recording apparatus, it is possible to realize the efficient ink jet recording.

EXAMPLES

Next, Examples of the present invention will be explained together with Comparative Examples. The present invention is neither limited to nor restricted by Examples and Comparative Examples described below at all.

Examples 1 to 25 and Comparative Examples 1 to 27

Components except for "CAB-O-JET (trade name) 300", which were included in ink composition components (Tables 1 and 2), were mixed uniformly to obtain ink solvents. Subsequently, the ink solvents were added gradually to "CAB-O-JET (trade name) 300", followed by being mixed uniformly. After that, obtained mixtures were filtrated through a cellulose acetate membrane filter (pore size 3.00 μm) produced by Toyo Roshi Kaisha, Ltd., and thus water base inks for ink jet recording of Examples 1 to 25 and Comparative Examples 1 to 27 were obtained.

The inks of Examples and Comparative Examples were subjected to (i) staining property (coloring property) evaluation, (ii) permeability evaluation, (iii) vaporization characteristic evaluation, (iv) water repellence evaluation, and (v) overall evaluation in accordance with the following methods.
(i) Staining Property Evaluation A test piece (height 70 mm×width 15 mm×thickness 3 mm) of polystyrene (produced by Idemitsu Petrochemical Co., Ltd., Grade HT-55) was placed in each of the inks of Examples and Comparative Examples so that about a half of the test piece was immersed therein, followed by being hermetically sealed and stored for 2 weeks in a thermostatic chamber at 60° C. After the storage, the test piece was taken out from the ink, and the test piece was rubbed and washed. After that, the test piece was visually observed, and the evaluation was made in accordance with the following evaluation criterion.

Evaluation Criterion for Staining Property Evaluation
   A: Test piece was not stained.
   C: Portion of the test piece immersed in the ink was stained.
(ii) Permeability Evaluation One-dot line was printed at a resolution of 600 dpi on a plain paper sheet ("Recycled Supreme" produced by XEROX) by using each of the inks of Examples and Comparative Examples, while setting the amount of one liquid droplet to be about 28 pL to 30 pL by using a digital multifunction machine DCP-350C provided with an ink jet printer produced by Brother Industries, Ltd. The line width of the one-dot line was measured by Personal IAS produced by QEA, and the evaluation was made in accordance with the following evaluation criterion.

Evaluation Criterion for Permeability Evaluation
   A: Line width was 120 μm to 130 μm.
   C (1): Line width was less than 120 μm.
   C (2): Line width was above 130 μm.
(iii) Vaporization Characteristic Evaluation 5 g of the ink of each of Examples and Comparative Examples was poured into an open vial made of glass (diameter: 20.2 mm). The open vial was stored in a thermostatic chamber at a temperature of 60° C. and a relative humidity of 40% until the weight change, which was measured at every 24 hours, was not more than ±0.01 g as compared with a result obtained 24 hours ago. After the storage, the state of the ink in the open vial was visually observed, and the evaluation was made in accordance with the following evaluation criterion.

Evaluation Criterion for Vaporization Characteristic Evaluation
   S: Ink flowed or moved when the open vial was inclined or vibrated.
   A: Ink did not flow or move even when the open vial was inclined or vibrated.
   C: Ink was dried up or evaporated to dryness.

Figure 4A:
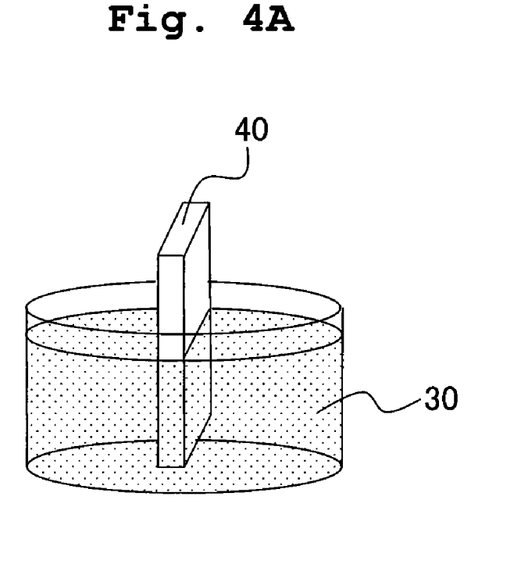
Figure 4B:
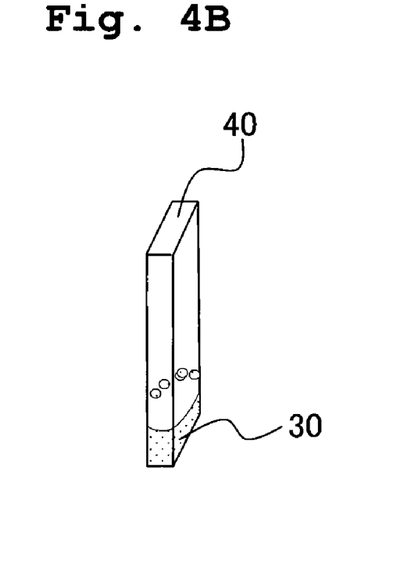

The evaluation criteria S, A, and C for the vaporization characteristic evaluation empirically correlate with the following discharge stabilities S', A', and C'.
   S': No problem arises in relation to the discharge stability in the continuous jetting operation.
   A': Discharge is slightly unstable in the continuous jetting operation.
   C': Discharge is unstable during the continuous jetting operation, and unstable discharge is not restored as it is.
(iv) Water Repellence Evaluation As shown in FIG. 4A, a test piece 40 (height 70 mm×width 15 mm×thickness 4 mm, arithmetical mean roughness ($R_a$) of 0.1 based on JIS B 0601 (1994)) of polypropylene (produced by Prime Polymer Co., Ltd., Grade J2000GP) was immersed in the ink 30 of each of Examples and Comparative Examples to such an extent that about a half of the total volume was immersed therein. Subsequently, 60 seconds were allowed to elapse in an upstanding state after taking out the test piece 40 from the ink 30, and then the amount of the ink 30 (adhering ink amount) adhered to the surface of the immersed portion of the test piece 40 was visually observed as shown in FIG. 4B. The evaluation was made in accordance with the following evaluation criterion.

Evaluation Criterion for Water Repellence Evaluation

S: Adhering ink amount was not more than 10% of the surface area of the immersed portion of the test piece (good water repellence).

A: Adhering ink amount was above 10% and not more than 30% of the surface area of the immersed portion of the test piece (fairly good water repellence).

B: Adhering ink amount was above 30% and not more than 80% of the surface area of the immersed portion of the test piece (slight water repellence).

C: Adhering ink amount was above 80% of the surface area of the immersed portion of the test piece (defective or unsatisfactory water repellence).

(v) Overall Evaluation

The overall evaluation was performed in accordance with the following evaluation criterion based on the results of (i) to (iv) described above for the inks of Examples and Comparative Examples.

Evaluation Criterion for Overall Evaluation

A: All of the evaluation results were S or A.

B: Any one of the evaluation results was B, but C was absent.

C: Any one of the evaluation results was C.

Ink compositions and evaluation results of Examples are shown in Table 1. Ink compositions and evaluation results of Comparative Examples are shown in Table 2.

Note that in Table 1:

*1: Self-dispersible black pigment, produced by Cabot Specialty Chemicals, pigment solid content=15% by weight (parenthesized numerals indicate pigment solid content amounts).

*2: Acetylene glycol-based surfactant (ethylene oxide (10 mol) adduct of acetylene diol), produced by Nissin Chemical Industry Co., Ltd., active ingredient amount=100% by weight (parenthesized numerals indicate active ingredient amounts).

*3: Acetylene glycol-based surfactant (ethylene oxide (65% by weight) adduct of acetylene diol), produced by Nissin Chemical Industry Co., Ltd., active ingredient amount=100% by weight (parenthesized numerals indicate active ingredient amounts).

*4: Sodium polyoxyethylene (3 E.O.) alkyl (C=12-13) ether sulfate, produced by Lion Corporation, active ingredient amount=28% by weight (parenthesized numerals indicate active ingredient amounts).

*5: Sodium polyoxyethylene (3 E.O.) lauryl ether sulfate, produced by Kao Corporation, active ingredient amount=25% by weight (parenthesized numerals indicate active ingredient amounts).

*6: Sodium polyoxyethylene (2 E.O.) lauryl ether sulfate, produced by Kao Corporation, active ingredient amount=27% by weight (parenthesized numerals indicate active ingredient amounts).

Note that in Table 2:

*1: Self-dispersible black pigment, produced by Cabot Specialty Chemicals, pigment solid content=15% by weight (parenthesized numerals indicate pigment solid content amounts).

*2: Acetylene glycol-based surfactant (ethylene oxide (10 mol) adduct of acetylene diol), produced by Nissin Chemical Industry Co., Ltd., active ingredient amount=100% by weight (parenthesized numerals indicate active ingredient amounts).

*4: Sodium polyoxyethylene (3 E.O.) alkyl (C=12-13) ether sulfate, produced by Lion Corporation, active ingredient amount=28% by weight (parenthesized numerals indicate active ingredient amounts).

TABLE 1

| | | | | Example | | | | |
|---|---|---|---|---|---|---|---|---|
| | | | | 1 | 2 | 3 | 4 | 5 |
| Ink composition (% by weight) | CAB-O-JET (trade name) 300 (*1) | | | 32.0 (4.80) | 32.0 (4.80) | 32.0 (4.80) | 32.0 (4.80) | 32.0 (4.80) |
| | Glycerol | | | 12.75 | 13.60 | 12.75 | 12.75 | 13.60 |
| | Diethylene glycol | | | 8.0 | 8.0 | 8.0 | 8.0 | 8.0 |
| | (A) | Diethylene glycol n-hexyl ether | | 0.05 | 0.05 | 0.05 | 0.05 | 0.05 |
| | (B1) | Acetylene glycol-based surfactant | Olfin (trade name) E1010 (*2) | 0.60 (0.60) | 0.60 (0.60) | 0.35 (0.35) | 0.35 (0.35) | 0.35 (0.35) |
| | | | Surfynol (trade name) 465 (*3) | — | — | — | — | — |
| | (B2) | Sodium polyoxyethylene alkyl ether sulfate | SUNNOL (trade name) NL1430 (*4) | 5.40 (1.51) | 0.60 (0.17) | 3.00 (0.84) | 4.00 (1.12) | 0.35 (0.10) |
| | | | EMAL (trade name) 20C (*5) | — | — | — | — | — |
| | | | EMAL (trade name) E-27E (*6) | — | — | — | — | — |
| | Water | | | balance | balance | balance | balance | balance |
| Evaluation | Staining property evaluation | | | A | A | A | A | A |
| | Permeability evaluation | | | A | A | A | A | A |
| | Vaporization characteristic evaluation | | | A | S | A | A | S |
| | Water repellence evaluation | | | S | A | A | S | A |
| Overall evaluation | | | | A | A | A | A | A |

TABLE 1-continued

|  |  |  | Example | | | | |
|---|---|---|---|---|---|---|---|
|  |  |  | 6 | 7 | 8 | 9 | 10 |
| Ink composition (% by weight) | CAB-O-JET (trade name) 300 (*1) | | 32.0 (4.80) | 32.0 (4.80) | 32.0 (4.80) | 32.0 (4.80) | 32.0 (4.80) |
|  | Glycerol | | 13.60 | 11.90 | 11.90 | 11.05 | 11.90 |
|  | Diethylene glycol | | 8.0 | 8.0 | 8.0 | 8.0 | 8.0 |
|  | (A) Diethylene glycol n-hexyl ether | | 0.05 | 0.05 | 0.25 | 0.50 | 0.50 |
|  | (B1) Acetylene glycol-based surfactant | Olfin (trade name) E1010 (*2) | 0.50 (0.50) | 0.50 (0.50) | 0.40 (0.40) | 0.45 (0.45) | 0.45 (0.45) |
|  |  | Surfynol (trade name) 465 (*3) | — | — | — | — | — |
|  | (B2) Sodium polyoxyethylene alkyl ether sulfate | SUNNOL (trade name) NL1430 (*4) | 1.20 (0.34) | 3.66 (1.02) | 3.66 (1.02) | 5.00 (1.40) | 3.00 (0.84) |
|  |  | EMAL (trade name) 20C (*5) | — | — | — | — | — |
|  |  | EMAL (trade name) E-27E (*6) | — | — | — | — | — |
|  | Water | | balance | balance | balance | balance | balance |
| Evaluation | Staining property evaluation | | A | A | A | A | A |
|  | Permeability evaluation | | A | A | A | A | A |
|  | Vaporization characteristic evaluation | | S | A | A | A | A |
|  | Water repellence evaluation | | A | S | A | A | A |
| Overall evaluation | | | A | A | A | A | A |

|  |  |  | Example | | | | |
|---|---|---|---|---|---|---|---|
|  |  |  | 11 | 12 | 13 | 14 | 15 |
| Ink composition (% by weight) | CAB-O-JET (trade name) 300 (*1) | | 32.0 (4.80) | 32.0 (4.80) | 32.0 (4.80) | 32.0 (4.80) | 32.0 (4.80) |
|  | Glycerol | | 11.90 | 12.75 | 11.90 | 12.75 | 11.90 |
|  | Diethylene glycol | | 8.0 | 8.0 | 8.0 | 8.0 | 8.0 |
|  | (A) Diethylene glycol n-hexyl ether | | 0.50 | 0.50 | 0.50 | 0.75 | 1.00 |
|  | (B1) Acetylene glycol-based surfactant | Olfin (trade name) E1010 (*2) | 0.20 (0.20) | 0.20 (0.20) | 0.20 (0.20) | 0.25 (0.25) | 0.30 (0.30) |
|  |  | Surfynol (trade name) 465 (*3) | — | — | — | — | — |
|  | (B2) Sodium polyoxyethylene alkyl ether sulfate | SUNNOL (trade name) NL1430 (*4) | 2.10 (0.59) | 1.50 (0.42) | 4.50 (1.26) | 3.00 (0.84) | 4.00 (1.12) |
|  |  | EMAL (trade name) 20C (*5) | — | — | — | — | — |
|  |  | EMAL (trade name) E-27E (*6) | — | — | — | — | — |
|  | Water | | balance | balance | balance | balance | balance |
| Evaluation | Staining property evaluation | | A | A | A | A | A |
|  | Permeability evaluation | | A | A | A | A | A |
|  | Vaporization characteristic evaluation | | A | A | A | A | A |
|  | Water repellence evaluation | | A | A | A | A | A |
| Overall evaluation | | | A | A | A | A | A |

|  |  |  | Example | | | | |
|---|---|---|---|---|---|---|---|
|  |  |  | 16 | 17 | 18 | 19 | 20 |
| Ink composition (% by weight) | CAB-O-JET (trade name) 300 (*1) | | 32.0 (4.80) | 32.0 (4.80) | 32.0 (4.80) | 32.0 (4.80) | 32.0 (4.80) |
|  | Glycerol | | 11.90 | 11.90 | 12.75 | 12.75 | 12.75 |
|  | Diethylene glycol | | 8.0 | 8.0 | 8.0 | 8.0 | 8.0 |
|  | (A) Diethylene glycol n-hexyl ether | | 1.00 | 1.00 | 1.00 | 1.00 | 1.00 |
|  | (B1) Acetylene glycol-based surfactant | Olfin (trade name) E1010 (*2) | 0.30 (0.30) | 0.30 (0.30) | 0.15 (0.15) | — | 0.15 (0.15) |
|  |  | Surfynol (trade name) 465 (*3) | — | — | — | 0.15 (0.15) | — |
|  | (B2) Sodium polyoxyethylene alkyl ether sulfate | SUNNOL (trade name) NL1430 (*4) | 3.00 (0.84) | 4.50 (1.26) | 2.00 (0.56) | 2.00 (0.56) | — |
|  |  | EMAL (trade name) 20C (*5) | — | — | — | — | 2.25 (0.56) |
|  |  | EMAL (trade name) E-27E (*6) | — | — | — | — | — |
|  | Water | | balance | balance | balance | balance | balance |
| Evaluation | Staining property evaluation | | A | A | A | A | A |
|  | Permeability evaluation | | A | A | A | A | A |
|  | Vaporization characteristic evaluation | | A | A | A | A | A |
|  | Water repellence evaluation | | A | A | A | A | A |
| Overall evaluation | | | A | A | A | A | A |

TABLE 1-continued

|  |  |  | Example | | | | |
|---|---|---|---|---|---|---|---|
|  |  |  | 21 | 22 | 23 | 24 | 25 |
| Ink composition (% by weight) | CAB-O-JET (trade name) 300 (*1) | | 32.0 (4.80) | 32.0 (4.80) | 32.0 (4.80) | 32.0 (4.80) | 32.0 (4.80) |
| | Glycerol | | 12.75 | 13.60 | 11.90 | 11.05 | 11.90 |
| | Diethylene glycol | | 8.0 | 8.0 | 8.0 | 8.0 | 8.0 |
| | (A) Diethylene glycol n-hexyl ether | | 1.00 | 1.00 | 1.00 | 1.00 | 1.00 |
| | (B1) Acetylene glycol-based surfactant | Olfin (trade name) E1010 (*2) | 0.15 (0.15) | 0.15 (0.15) | 0.15 (0.15) | 0.15 (0.15) | 0.26 (0.26) |
| | | Surfynol (trade name) 465 (*3) | — | — | — | — | — |
| | (B2) Sodium polyoxyethylene alkyl ether sulfate | SUNNOL (trade name) NL1430 (*4) | — | 1.50 (0.42) | 3.66 (1.02) | 4.00 (1.12) | 3.66 (1.02) |
| | | EMAL (trade name) 20C (*5) | — | — | — | — | — |
| | | EMAL (trade name) E-27E (*6) | 2.06 (0.56) | — | — | — | — |
| | Water | | balance | balance | balance | balance | balance |
| Evaluation | Staining property evaluation | | A | A | A | A | A |
| | Permeability evaluation | | A | A | A | A | A |
| | Vaporization characteristic evaluation | | A | A | A | A | A |
| | Water repellence evaluation | | A | A | A | A | A |
| Overall evaluation | | | A | A | A | A | A |

TABLE 2

|  |  |  | Comparative Example | | | | | |
|---|---|---|---|---|---|---|---|---|
|  |  |  | 1 | 2 | 3 | 4 | 5 | 6 |
| Ink composition (% by weight) | CAB-O-JET (trade name) 300 (*1) | | 32.0 (4.80) | 32.0 (4.80) | 32.0 (4.80) | 32.0 (4.80) | 32.0 (4.80) | 32.0 (4.80) |
| | Glycerol | | 12.75 | 12.75 | 12.75 | 13.60 | 12.75 | 13.60 |
| | Diethylene glycol | | 8.0 | 8.0 | 8.0 | 8.0 | 8.0 | 8.0 |
| | Triethylene glycol n-butyl ether | | — | — | — | — | — | — |
| | Dipropylene glycol n-propyl ether | | — | — | — | — | — | — |
| | (A) Diethylene glycol n-hexyl ether | | 0.03 | 0.05 | 0.05 | 0.05 | 0.05 | 0.05 |
| | (B1) Acetylene glycol-based surfactant | Olfin (trade name) E1010 (*2) | 0.70 (0.70) | 0.70 (0.70) | 0.60 (0.60) | 0.60 (0.60) | 0.35 (0.35) | 0.35 (0.35) |
| | (B2) Sodium polyoxyethylene alkyl ether sulfate | SUNNOL (trade name) NL1430 (*4) | 4.00 (1.12) | 4.00 (1.12) | 6.00 (1.68) | 0.48 (0.13) | 4.50 (1.26) | 0.14 (0.04) |
| | Water | | balance | balance | balance | balance | balance | balance |
| Evaluation | Staining property evaluation | | A | A | A | A | A | A |
| | Permeability evaluation | | C (1) | C (2) | A | A | A | A |
| | Vaporization characteristic evaluation | | A | A | C | S | C | S |
| | Water repellence evaluation | | B | B | S | C | S | C |
| Overall evaluation | | | C | C | C | C | C | C |

|  |  |  | Comparative Example | | | | | |
|---|---|---|---|---|---|---|---|---|
|  |  |  | 7 | 8 | 9 | 10 | 11 | 12 |
| Ink composition (% by weight) | CAB-O-JET (trade name) 300 (*1) | | 32.0 (4.80) | 32.0 (4.80) | 32.0 (4.80) | 32.0 (4.80) | 32.0 (4.80) | 32.0 (4.80) |
| | Glycerol | | 12.75 | 11.90 | 11.05 | 11.90 | 11.05 | 11.05 |
| | Diethylene glycol | | 8.0 | 8.0 | 8.0 | 8.0 | 8.0 | 8.0 |
| | Triethylene glycol n-butyl ether | | — | — | — | — | — | — |
| | Dipropylene glycol n-propyl ether | | — | — | — | — | — | — |
| | (A) Diethylene glycol n-hexyl ether | | 0.05 | 0.25 | 0.50 | 0.50 | 0.50 | 0.50 |
| | (B1) Acetylene glycol-based surfactant | Olfin (trade name) E1010 (*2) | 0.25 (0.25) | 0.10 (0.10) | 0.45 (0.45) | 0.45 (0.45) | 0.50 (0.50) | 0.20 (0.20) |
| | (B2) Sodium polyoxyethylene alkyl ether sulfate | SUNNOL (trade name) NL1430 (*4) | 2.70 (0.76) | 2.00 (0.56) | 5.50 (1.54) | 2.25 (0.63) | 5.00 (1.40) | 6.50 (1.82) |
| | Water | | balance | balance | balance | balance | balance | balance |
| Evaluation | Staining property evaluation | | A | A | A | A | A | A |
| | Permeability evaluation | | C (1) | C (1) | A | A | C (2) | A |
| | Vaporization characteristic evaluation | | S | S | C | A | C | C |
| | Water repellence evaluation | | S | S | A | C | A | S |
| Overall evaluation | | | C | C | C | C | C | C |

TABLE 2-continued

|  |  |  | Comparative Example | | | | | |
| --- | --- | --- | --- | --- | --- | --- | --- | --- |
|  |  |  | 13 | 14 | 15 | 16 | 17 | 18 |
| Ink composition (% by weight) | CAB-O-JET (trade name) 300 (*1) | | 32.0 (4.80) | 32.0 (4.80) | 32.0 (4.80) | 32.0 (4.80) | 32.0 (4.80) | 32.0 (4.80) |
|  | Glycerol | | 13.60 | 12.75 | 11.05 | 11.90 | 10.20 | 10.20 |
|  | Diethylene glycol | | 8.0 | 8.0 | 8.0 | 8.0 | 8.0 | 8.0 |
|  | Triethylene glycol n-butyl ether | | — | — | — | — | — | — |
|  | Dipropylene glycol n-propyl ether | | — | — | — | — | — | — |
|  | (A) Diethylene glycol n-hexyl ether | | 0.50 | 0.50 | 0.50 | 0.75 | 1.00 | 1.00 |
|  | (B1) Acetylene glycol-based surfactant | Olfin (trade name) E1010 (*2) | 0.20 (0.20) | 0.15 (0.15) | 0.20 (0.20) | 0.10 (0.10) | 0.40 (0.40) | 0.30 (0.30) |
|  | (B2) Sodium polyoxyethylene alkyl ether sulfate | SUNNOL (trade name) NL1430 (*4) | 0.24 (0.07) | 1.50 (0.42) | 5.00 (1.40) | 2.80 (0.78) | 5.33 (1.49) | 5.00 (1.40) |
|  | Water | | balance | balance | balance | balance | balance | balance |
| Evaluation | Staining property evaluation | | A | A | A | A | A | A |
|  | Permeability evaluation | | A | C (1) | A | C (1) | C (2) | A |
|  | Vaporization characteristic evaluation | | A | A | C | A | C | C |
|  | Water repellence evaluation | | C | A | A | A | A | A |
| Overall evaluation | | | C | C | C | C | C | C |

|  |  |  | Comparative Example | | | | | |
| --- | --- | --- | --- | --- | --- | --- | --- | --- |
|  |  |  | 19 | 20 | 21 | 22 | 23 | 24 |
| Ink composition (% by weight) | CAB-O-JET (trade name) 300 (*1) | | 32.0 (4.80) | 32.0 (4.80) | 32.0 (4.80) | 32.0 (4.80) | 32.0 (4.80) | 32.0 (4.80) |
|  | Glycerol | | 12.75 | 11.05 | 13.60 | 13.60 | 13.60 | 8.50 |
|  | Diethylene glycol | | 8.0 | 8.0 | 8.0 | 8.0 | 8.0 | 8.0 |
|  | Triethylene glycol n-butyl ether | | — | — | — | — | — | 9.0 |
|  | Dipropylene glycol n-propyl ether | | — | — | — | — | — | — |
|  | (A) Diethylene glycol n-hexyl ether | | 1.00 | 1.00 | 1.00 | 1.00 | 1.50 | — |
|  | (B1) Acetylene glycol-based surfactant | Olfin (trade name) E1010 (*2) | 0.30 (0.30) | 0.15 (0.15) | 0.15 (0.15) | 0.05 (0.05) | 0.15 (0.15) | 0.15 (0.15) |
|  | (B2) Sodium polyoxyethylene alkyl ether sulfate | SUNNOL (trade name) NL1430 (*4) | 2.50 (0.70) | 4.50 (1.26) | 1.00 (0.28) | 1.33 (0.37) | 1.80 (0.50) | 3.66 (1.02) |
|  | Water | | balance | balance | balance | balance | balance | balance |
| Evaluation | Staining property evaluation | | A | A | A | A | C | A |
|  | Permeability evaluation | | A | A | A | C (1) | C (2) | A |
|  | Vaporization characteristic evaluation | | A | C | A | A | A | C |
|  | Water repellence evaluation | | C | S | C | A | A | A |
| Overall evaluation | | | C | C | C | C | C | C |

|  |  |  | Comparative Example | | |
| --- | --- | --- | --- | --- | --- |
|  |  |  | 25 | 26 | 27 |
| Ink composition (% by weight) | CAB-O-JET (trade name) 300 (*1) | | 32.0 (4.80) | 32.0 (4.80) | 32.0 (4.80) |
|  | Glycerol | | 9.35 | 11.90 | 11.90 |
|  | Diethylene glycol | | 8.0 | 8.0 | 8.0 |
|  | Triethylene glycol n-butyl ether | | — | — | — |
|  | Dipropylene glycol n-propyl ether | | 6.0 | — | — |
|  | (A) Diethylene glycol n-hexyl ether | | — | 1.00 | 1.00 |
|  | (B1) Acetylene glycol-based surfactant | 14 Olfin (trade name) E1010 (*2) | 0.15 (0.15) | — | 0.15 (0.15) |
|  | (B2) Sodium polyoxyethylene alkyl ether sulfate | SUNNOL (trade name) NL1430 (*4) | 3.66 (1.02) | 4.00 (1.12) | — |
|  | Water | | balance | balance | balance |
| Evaluation | Staining property evaluation | | A | A | A |
|  | Permeability evaluation | | A | C (1) | A |
|  | Vaporization characteristic evaluation | | C | A | A |
|  | Water repellence evaluation | | A | A | C |
| Overall evaluation | | | C | C | C |

As shown in Table 1, the inks of Examples 1 to 25 had the good results of all of the staining property evaluation, the permeability evaluation, the vaporization characteristic evaluation, and the water repellence evaluation. The compositions of (A), (B1), and (B2) in Examples 1 to 25 can be expressed by the coordinates p1 to p25 in the xyz coordinate system shown in FIG. 1 as described above. All of the coordinates are included in the tetradecahedron having the boundary surfaces of P1 to P14, i.e., in the tetradecahedron defined by the coordinates p1, p4, p13, p24, p17, p9, p2, p5, p12, p22, p16, and p10. As described above, the tetradecahedron, which has the boundary surfaces of P1 to P14, can be divided into the four pentahedrons, i.e., the pentahedron p1p4p9-p2p5p10, the pentahedron p4p9p13-p5p10p12, the pentahedron p9p13p17-p10p12p16, and the pentahedron p13p17p24-p12p16p22. Therefore, the coordinates p1 to p25 are included in at least one pentahedron of the foregoing four pentahedrons respectively. In other words, the coordinates p1 to p25 fulfill at least one condition of the conditions (a) to (d) described above respectively. For example, the coordinate p1 (0.05, 0.60, 1.51), which represents the compositions of (A), (B1), and (B2) in Example 1, is included only in the pentahedron p1p4p9-p2p5p10. Therefore, it is affirmed that the compositions of (A), (B1), and (B2) in Example 1 fulfill the condition (a). Further, for example, the coordinate p3 (0.05, 0.35, 0.84), which represents the compositions of (A), (B1), and (B2) in Example 3, exists on the boundary surface between the pentahedron p1p4p9-p2p5p10 and the pentahedron p4p9p13-p5p10p12, and the coordinate p3 (0.05, 0.35, 0.84) is included in both of the pentahedron p1p4p9-p2p5p10 and the pentahedron p4p9p13-p5p10p12. Therefore, it is affirmed that the compositions of (A), (B1), and (B2) in Example 3 fulfill the conditions (a) and (b). Further, for example, the coordinate p9 (0.50, 0.45, 1.40), which represents the compositions of (A), (B1), and (B2) in Example 9, is included in all of the pentahedron p1p4p9-p2p5p10, the pentahedron p4p9p13-p5p10p12, and the pentahedron p9p13p17-p10p12p16. Therefore, it is affirmed that the compositions of (A), (B1), and (B2) in Example 9 fulfill all of the conditions (a), (b), and (c).

On the other hand, as shown in Table 2, the ink of Comparative Example 1, which had the small blending amount of (A), which had the large blending amount of (B1) and which did not fulfill any one of the conditions (a) to (d), was inferior in the results of the permeability evaluation and the water repellence evaluation. The ink of Comparative Example 2, which had the large blending amount of (B1) and which did not fulfill any one of the conditions (a) to (d), was inferior in the results of the permeability evaluation and the water repellence evaluation. The inks of Comparative Examples 3, 5, 9, 12, 15, 18 and 20, which had the large blending amounts of (B2) and which did not fulfill any one of the conditions (a) to (d), were inferior in the results of the vaporization characteristic evaluation. Further, the inks of Comparative Examples 4, 6, 10, 13, 19 and 21, which had the small blending amounts of (B2) and which did not fulfill any one of the conditions (a) to (d), were inferior in the results of the water repellence evaluation. Further, the inks of Comparative Examples 7, 8, 14, 16 and 22, which had the small blending amounts of (B1) and which did not fulfill any one of the conditions (a) to (d), were inferior in the results of the permeability evaluation. Further, the inks of Comparative Examples 11 and 17, which had the large blending amounts of (B1) and (B2) and which did not fulfill any one of the conditions (a) to (d), were inferior in the results of the permeability evaluation and the vaporization characteristic evaluation. Further, the ink of Comparative Example 23, which had the large blending amount of (A) and which did not fulfill any one of the conditions (a) to (d), was inferior in the results of the staining property evaluation and the permeability evaluation. Further, the inks of Comparative Examples 24 and 25, in which (A) was not contained, were inferior in the results of the vaporization characteristic evaluation due to triethylene glycol n-butyl ether or dipropylene glycol n-propyl ether blended instead of (A). Further, the ink of Comparative Example 26, in which (B1) was not contained, was inferior in the result of the permeability evaluation. Further, the ink of Comparative Example 27, in which (B2) was not contained, was inferior in the result of the water repellence evaluation. In other words, all of the coordinates p'1 to p'27, which represent the compositions of (A), (B1), and (B2) in Comparative Examples 1 to 27, are not included in the tetradecahedron having the boundary surfaces of P1 to P14 shown in FIG. 1, i.e., in the tetradecahedron defined by the coordinates p1, p4, p13, p24, p17, p9, p2, p5, p12, p22, p16, and p10. Any good result was not obtained in at least one evaluation of the staining property evaluation, the permeability evaluation, the vaporization characteristic evaluation, and the water repellence evaluation in Comparative Examples.

As described above, the water base ink for ink jet recording of the present invention is excellent in the permeability, the vaporization characteristic, and the water repellence. Further, the water base ink for ink jet recording of the present invention does not deteriorate the resin material forming the casing or the like of the ink-jet recording apparatus. The way of use of the water base ink for ink-jet recording of the present invention is not limited. The water base ink for ink-jet recording of the present invention is widely applicable to various types of the ink-jet recording.

What is claimed is:

1. A water base ink for ink-jet recording comprising a coloring agent, water, a penetrant, and a surfactant, wherein:
   the penetrant includes diethylene glycol n-hexyl ether (A);
   the surfactant includes an acetylene glycol-based surfactant (B1) and sodium polyoxyethylene alkyl ether sulfate (B2); and
   (A), (B1), and (B2) are blended at ratios respectively to fulfill at least one condition of the following conditions (a) to (d):

condition (a): all of expressions (a1) to (a5) hold:

$$x \geq 0.05 \tag{a1}$$

$$40.3x + 228.15y - 146.25z + 81.9325 \geq 0 \tag{a2}$$

$$124.6x + 22.05y - 78.75z - 6.0725 \leq 0 \tag{a3}$$

$$y \geq 2x/9 + 3.05/9 \tag{a4}$$

$$y \leq -x/3 + 1.85/3 \tag{a5}$$

condition (b): all of expressions (b1) to (b5) hold:

$$x \leq 0.50 \tag{b1}$$

$$56x + 63y - 112.5z + 101.15 \geq 0 \tag{b2}$$

$$2.002x + 2.646y - 1.575z - 0.8687 \leq 0 \tag{b3}$$

$$y \geq -x/3 + 1.1/3 \tag{b4}$$

$$y \leq 2x/9 + 3.05/9 \tag{b5}$$

condition (c): all of expressions (c1) to (c5) hold:

$$x \geq 0.50 \tag{c1}$$

$$2.8x - 14y + 25z - 30.1 \leq 0 \tag{c2}$$

$$12.6x + 42y - 25z - 4.2 \leq 0 \tag{c3}$$

$$y \geq x/5 + 0.1 \tag{c4}$$

$$y \leq -3x/10 + 0.6 \tag{c5}$$

condition (d): all of expressions (d1) to (d5) hold:

$$x \leq 1.00 \tag{d1}$$

$$14x - 70y + 75z - 87.5 \leq 0 \tag{d2}$$

$$1.4x + 14y - 5z - 1.4 \leq 0 \tag{d3}$$

$$y \geq -x/10 + 0.25 \tag{d4}$$

$$y \leq x/5 + 0.1 \tag{d5}$$

wherein:
- x: blending amount (% by weight) of (A) with respect to a total amount of the ink;
- y: blending amount (% by weight) of (B1) with respect to the total amount of the ink;
- z: blending amount (% by weight) of (B2) with respect to the total amount of the ink.

2. The water base ink for ink-jet recording according to claim 1, wherein (B1) includes a surfactant represented by the following general formula (1):

wherein:
- m and n are numbers which fulfill m+n=0 to 20, m and n are identical with each other or different from each other;
- each of $R^1$, $R^2$, $R^3$, and $R^4$ is a straight chain or branched chain alkyl group having a number of carbon atom or atoms of 1 to 5, and $R^1$, $R^2$, $R^3$, and $R^4$ are identical with each other or different from each other in the general formula (1).

3. The water base ink for ink-jet recording according to claim 1, wherein a polymerization degree of polyoxyethylene of (B2) is 0 to 9.

4. The water base ink for ink-jet recording according to claim 1, wherein an alkyl group of (B2) is a straight chain alkyl group having a number of carbon atoms of 10 to 16.

5. An ink cartridge comprising a water base ink for ink jet recording, wherein the ink is the water base ink for ink jet recording as defined in claim 1.

6. The ink cartridge according to claim 5, wherein the ink cartridge is formed of at least one resin selected from the group consisting of polypropylene, polyethylene, acrylonitrile-butadiene-styrene copolymer synthetic resin, acrylonitrile-ethylene-styrene copolymer synthetic resin, and polystyrene.

7. An ink-jet recording apparatus comprising an ink cartridge and an ink discharge section, and discharging an ink contained in the ink cartridge from the ink discharge section, wherein the ink cartridge is the ink cartridge as defined in claim 5.

8. The water base ink for ink-jet recording according to claim 1, wherein (A), (B1), and (B2) are blended at ratios respectively to fulfill the condition (a).

9. The water base ink for ink jet recording according to claim 1, wherein the coloring agent is a pigment.

10. A water base ink for ink jet recording comprising a coloring agent, water, a penetrant, and a surfactant, wherein:
- the penetrant includes diethylene glycol n-hexyl ether;
- the surfactant includes an acetylene glycol-based surfactant and sodium polyoxyethylene alkyl ether sulfate; and
- x, y, and z are included in a tetradecahedron defined by the following coordinates c1 to c12 provided that x, y, and z represent blending ratios (% by weight) of the diethylene glycol n-hexyl ether, the acetylene glycol-based surfactant and the sodium polyoxyethylene alkyl ether sulfate in the water base ink for ink-jet recording respectively:
  - c1 (0.05, 0.60, 1.51)
  - c2 (0.05, 0.60, 0.17)
  - c3 (0.05, 0.35, 1.12)
  - c4 (0.05, 0.35, 0.10)
  - c5 (0.50, 0.45, 1.40)
  - c6 (0.50, 0.45, 0.84)
  - c7 (0.50, 0.20, 0.42)
  - c8 (0.50, 0.20, 1.26)
  - c9 (1.00, 0.30, 0.84)
  - c10 (1.00, 0.30, 1.26)
  - c11 (1.00, 0.15, 0.42)
  - c12 (1.00, 0.15, 1.12).

11. The water base ink for ink jet recording according to claim 10, wherein x, y, and z are included in a pentahedron defined by the coordinates c1 to c6.

12. The water base ink for ink jet recording according to claim 10, wherein the coloring agent is a pigment.

* * * * *